United States Patent [19]

Dougherty et al.

[11] Patent Number: 4,885,319

[45] Date of Patent: Dec. 5, 1989

[54] SOLVENT RESISTANT IRRADIATION CURABLE COATINGS

[75] Inventors: James A. Dougherty, Pequannock; Fulvio J. Vara, Chester, both of N.J.

[73] Assignee: GAF Corporation, Wayne, N.J.

[21] Appl. No.: 282,527

[22] Filed: Dec. 12, 1988

Related U.S. Application Data

[62] Division of Ser. No. 161,512, Feb. 29, 1988, abandoned.

[51] Int. Cl.$^4$ .................. C08F 283/10; C08F 2/50
[52] U.S. Cl. ..................... 522/31; 522/142; 522/170; 525/502; 525/529; 528/110; 528/393
[58] Field of Search ............ 427/36, 44, 54.1; 522/31, 89, 121, 142, 170; 525/312, 502, 529; 527/313; 528/90, 110, 393

[56] References Cited

U.S. PATENT DOCUMENTS

| | | | |
|---|---|---|---|
| 4,108,747 | 8/1978 | Crivello | 522/31 |
| 4,617,354 | 10/1986 | Augustin | 525/312 |
| 4,654,379 | 3/1987 | Lapin | 522/31 |
| 4,766,252 | 8/1988 | Vara | 427/44 |

OTHER PUBLICATIONS

Smith/Do/Wagener, Bismaleimide-Vinylether Matrix Copolymers *Polymer Preprints*, vol. 29, #1, pp. 337–338, Jun. 1988.

*Primary Examiner*—John C. Bleutge
*Assistant Examiner*—David Buttner
*Attorney, Agent, or Firm*—Marilyn J. Maue; Joshua J. Ward

[57] ABSTRACT

The invention relates to a blend of divinyl ethers and their use as diluents for irradiation curable resins, which blend comprises between about 65 wt. % and about 35 wt. % of a hydrophobic divinyl ether containing from 6 to 30 carbon atoms and having a Tg of from about 20° C. to about 150° C. and between about 35 wt. % and about 65 wt. % of a hydrophilic polyethylene glycol divinyl ether.

11 Claims, No Drawings

SOLVENT RESISTANT IRRADIATION CURABLE COATINGS

This is a division of application Ser. No. 161,512, filed Feb. 29, 1988, now abandoned.

In one aspect, the invention relates to a novel blend of divinyl ethers for use as a diluent in improving solvent and stain resistance of an irradiation curable resin.

In another aspect the invention relates to the process of incorporating said blend into said resin and the product obtained by said process.

In still another aspect, the invention relates to the use of said product.

BACKGROUND OF THE INVENTION

Irradiation of resins such as epoxides, with or without inert resins, e.g. cellulose esters, acrylics, vinyl and vinylidene halides, and sucrose esters, in the presence of cationic photoinitiators, generally possess reasonable cure speeds and desirable flexibility for many uses. However, certain objectionable characteristics including low stain and solvent resistance and high viscosity have occasioned much research to overcome these disadvantages. It has been found that in addition to coating difficulties associated with high viscosity epoxy resins, these coatings on a substrate often lead to an uneven film layer which can cause deviations in imaging where high resolution and uniformity are required.

Accordingly, it is an object of this invention to overcome the above difficulties by an economical and commercially feasible expedient.

Another object of this invention is to provide an irradiation curable system having significantly reduced viscosity, increased stain and solvent resistance while maintaining high cure speeds and desirable flexibility.

These and other objects of the invention will become apparent from the following description and disclosure.

In accordance with the present invention there is provided a blend a divinyl ethers comprising between about 65 wt. % and about 35 wt. % of a hydrophobic divinyl ether containing from 6 to 30 carbon atoms and having a Tg of from about 20° C. to about 150° C. and between about 35 wt. % and about 65 wt. % of a hydrophilic polyethylene glycol divinyl ether. The preferred blend is one which contains between about 55 wt. % and about 40 wt. % of the hydrophobic component and between about 40 wt. % and about 55 wt. % of the hydrophilic component. Suitable hydrophobic divinyl ethers employed in this invention include the divinyl ethers of hexanediol, octanediol, cyclohexanedimethanol, cyclobutanediethanol, cyclooctanedimethanol, isopropanediol, dodecanediol, cyclohexanedibutanol, cyclopentanediol, polypropylene glycol, etc. Representative of suitable hydrophilic components include the mono-, di-, tri- and tetraethylene glycol divinyl ethers.

The present blends are employed as diluents for certain irradiation curable epoxy resins having a molecular weight of from about 300 to about 5,000 and are incorporated therein in an amount between about 10 wt. % and about 70 wt. %, preferably between about 30 wt. % and about 55 wt. %, based on the total resin composition. The resin suitable for use in the present invention include those of diepoxides. Specific examples of such epoxy resins include bisphenol A diepoxides, epoxides of phenol-formaldehyde resins such as novolacs having an average epoxide functionality of from about 2.2 to about 4.5, as disclosed in EPOXY RESIN TECHNOLOGY by Alan R. Heath, published by John Wiley & Sons, pages 31 through 35. The bisphenol diepoxides and the novolacs are the preferred resins of the present invention. Illustrative of inert resins which may be optionally employed in admixture with the epoxy resins are the resins of cellulose acetate butyrate; vinyl chloride; vinylidene chloride; sucrose butyrate; acrylonitrile; the methyl-, ethyl- and butyl-esters of acrylic or methacrylic acid, etc.

The divinyl ether blend of the present invention is mixed with the resin in the proper amount to form a liquid solution of the resinous component. The resulting liquid product is one of significantly reduced viscosity as compared to the non-diluted resin of the same molecular weight. For example, the present blend reduces the viscosity of the resin by at least 2-fold and up to about a 50-fold reduction has been achieved in many cases. Accordingly, smooth uniform films of the diluted resin can be applied to substrates to form a smooth, uniform coating capable of providing high resolution and uniform image development.

The present liquid mixture can be coated in a thickness of from about 0.1 to about 50 mils, preferably from about 0.2 to about 10 mils on a suitable substrate such as a metal, e.g. steel, copper, aluminum, etc., glass, polyester, polystyrenes, polycarbonates, methacrylates, etc.

The present resin composition is cured by irradiation which includes exposure to UV light, electron beam, gamma rays, X-rays, actinic light, plasma radiation and particle radiation. The films can be deposited on the substrate by the Langmuir Blodgett technique or can be coated with standard coating equipment to obtain thicker films.

Suitable compositions for curing generally include an initiator and a wetting agent. Silicone block copolymers and fluorinated surfactants are employed as wetting agents with the blended resin in an amount between about 0.01 and about 1 wt. %, preferably, between about 0.15 and about 0.5 wt. %. Wetting agents which have been found to be particularly beneficial include the fluorinated alkyl esters such as Fluorad ® FC-430 and Fluorad ® FC-171 supplied by Minnesota Mining and Manufacturing Co.

The initiator is employed in an amount of between about 0.25 wt. % and about 5 wt. %, preferably between about 0.5 wt. % and about 3 wt. % with respect to the total composition. Representative of suitable initiators are the onium salts such as sulfonium, iodonium and phosphonium salts. Specific examples of these include bis(4-t-butylphenyl)iodonium hexafluorophosphate, bis(4-t-butylphenyl)antimonium hexafluorophosphate, diphenyl iodonium tetrafluoroborate, triaryl sulfonium hexafluoroantimonate, (4-hydroxy-3,5-dimethylphenyl)dimethyl sulfonium hexafluorophosphate, benzoyl dibutyl sulfonium hexafluorophosphate, triethyl sulfonium hexafluorophosphate, diphenyliodonium hexafluorophosphate, sulfonium, (thiodi-4,1-phenylene)bis-diphenyl, hexafluoroantimonate, also known as bis-[4-(diphenyl sulfonio)phenyl]sulfide-bis hexafluorophosphate benzyltetramethylene sulfonium hexafluorophosphate benzyl tetramethylene sulfonium hexafluoroantimonate phenacyl tetramethylene sulfonium hexafluorophosphate phenacryl tetramethylene sulfonium hexafluoroantimonate triphenyl sulfonium hexafluoroarsenate 10-phenyl-10-phenoxathionium hexafluoroarsenate diphenyl[4-(phenylthio)phenyl]sulfonium hexafluoroarsenate, triphenyl sulfonium hexafluorophosphate, diphenyl iodonium hexafluoroantimonate, trixylyl sulfonium hexafluorophosphate, ditolyl iodonium hexafluoroantimonate, etc.

Of these, the sulfonium initiators are preferred and triphenyl sulfonium hexafluorophosphate is most preferred.

The above components are combined by mixing the blend with the resin or by mixing the hydrophilic component of the blend with the resin and subsequently adding the hydrophobic component at a temperature of between about 40° C. and about 150° C. until a homogeneous liquid mixture is obtained, usually within a period of about 8 hours.

The initiator and wetting agent are then added to the mixture under the same temperature conditions and intermixed until a uniform liquid is obtained. The composition may also include other adjuvants such as stabilizers, adhesion promoters, pigments, pigment dispersants, inert fillers and slip aids depending upon the option of the formulator. The composition is then ready to be applied to a selected substrate as a smooth, uniform film of at least 0.1 mil thickness. The coated substrate is then subjected to a source of radiation for curing. The resins of the present invention have been found to cure at line speeds ranging from 40 to 700 using 2×200 watts/inch mercury vapor lamps. Using electron beam, dosages of 0.25 to 5 Mrads are used. The substrate coatings become tack-free almost instantaneously and exhibit high resistance to staining and solvent deterioration. The coatings also display good hardness and adhesion to substrates.

The cured substrate is generally subjected to a post cure operation for a period of from about 2 weeks at room temperature to about 5 minutes at 200° C., elevated temperatures hastening the post cure operation. The resulting coatings are clear, water-white films which possess good flexibility.

A unique property of cyclohexane dimethanol divinyl ether is that the above benefits are achieved in the absence of the hydrophilic component when blended with bisphenol A diepoxide having a molecular weight less than 400 when employed in a mole ratio of about 1:1 and such coated resin is subjected to curing with UV light. The resulting film is highly resistant to ketone solvent, which result is wholly unexpected since cyclohexane dimethanol divinyl ether is hydrophobic and one would not expect increased solvent resistance resulting from higher hydrophobicity.

Having thus described the invention, reference is now had to the accompanying Examples which are presented to illustrate preferred embodiments but which are not to be construed as limiting to the scope of the invention as more broadly set forth above and in the appended claims. All amounts and ratios in the following Examples are by weight unless otherwise indicated.

EXAMPLES A-D

A. The following blends were prepared and mixed with diepoxy resin as described below. To a 4 ounce amber colored bottle was added 25 g. of bisphenol diepoxide having a molecular weight of 370-384 (EPON ®- 828) and 12.5 g. (0.062 moles) of triethylene glycol divinyl ether (RAPI-CURE TM DVE-3) at a temperature of 45° C. with constant agitation. After a uniformly blended liquid mixture was obtained, 0.062 moles of 1,4-cyclohexane dimethanol divinyl ether (RAPI-CURE TM CHVE) was added and agitation was continued for an additional 15 minutes at the blend temperature. After a uniform liquid mixture was obtained 0.25 g. of a fluorinated alkyl ester surfactant (Fluorad ® 171 supplied by 3M Co.) and 2 g. of FX-512 (triphenyl sulfonium hexafluorophosphate) initiator were added and mixed therein at about 45° C. The resulting liquid product is designated sample A.

B. The above procedure was repeated except that 0.062 moles of 1,6-hexanediol divinyl ether was substituted for 1,4-cyclohexane dimethanol divinyl ether and the resulting liquid product is designated sample B.

C. The procedure employed for sample A was repeated except that 0.062 moles of triethylene glycol divinyl ether was substituted for 1,4-cyclohexane dimethanol divinyl ether and the resulting liquid product is designated sample C.

D. The procedure employed for sample A was again repeated except that [(3,4-epoxycyclohexyl)methyl] 3',4'-epoxycyclohexane carboxylate was substituted for 1,4-cyclohexane dimethanol divinyl ether and the resulting liquid product is designated sample D.

Each of the above formulations were individually coated on aluminum panels by hand draw-down using a number 3 Mayer bar to give a coating thickness of about 6.5 microns. The corresponding panels A-D were then subjected to a UV light exposure of 15 joules/cm$^2$ by passing them under two 200 watt/inch UV lamps at 100 feet/minute. This was followed by a thermal bake at 177° C. for 10 minutes. The coatings were then subjected to a Cross-Cut Tape Test (ASTM D-3359-K-B) and a Boiling Water Immersion Test. For the water immersion, the coated panel was immersed in boiling water for 30 minutes, after which it was removed, dried and subjected to adhesion test ASTM D-3359-K-B. All of the above samples showed satisfactory adhesion in both Cross-Cut and boiling water immersion tests, i.e. greater than 85% adhesion.

The above coating of panels with samples A-D is repeated, except that coatings of 0.2 mil were applied and water immersion and cross-cut tests were omitted. These coatings were then subjected to a ketone solvent resistance test. For the solvent resistance test, a methylethyl ketone saturated cheesecloth was rubbed across the surface of the coated panel under a constant pressure. The number of back and forth strokes needed to break through the coating was recorded. The results of these tests are reported in following Table I.

TABLE I

| | SAMPLES | | | |
|---|---|---|---|---|
| | A | B | C | D |
| Resistance (No. of runs before coating break through) | 81 | 60 | 44 | 5 |

EXAMPLES E AND F 1,4-cyclohexane dimethanol divinyl ether (CHVE) was evaluated as the sole reactive diluent for low molecular weight bisphenol "A" epoxy resin (EPON-828).

E. The liquid coating was prepared by the procedure described in Example A, except that the addition of triethylene glycol divinyl ether was omitted and CHVE was mixed directly with EPON ®-828 in a 50/50 wt. ratio. The liquid product is designated sample E.

F. Another liquid coating was prepared by the procedure in Example A except that the addition of CHVE was omitted and the triethylene glycol divinyl ether (DVE-3) was mixed with resin in 50/50 wt. ratio. The liquid product is designated sample F. Each of the samples was coated on an aluminum panel, UV cured at 100 fpm with two 200 watt/inch lamps and baked for 10 minutes at 177° C.

Samples E and F were compared and it was noted that sample E imparts an increase in glass transition temperature while maintaining a rapid cure speed. The CHVE also possesses a surprising improvement in solvent resistance; the number of MEK double rubs increasing by a factor of over 20. Finally it is noted that the CHVE formulation exhibits a higher tensile strength with lower elongation. The results of these comparisons are reported in following Table II.

TABLE II

| | 50% Vinyl Ether/50% EPON-828 | | |
|---|---|---|---|
| Formulation # | A | E | F |
| Reactive Diluent | CHVE + DVE-3 | CHVE | DVE-3 |
| Tg (°C.) | 65 | 72 | 35 |
| Max. Cure Speed (fpm) | 700 | 700 | 700 |
| Tackfree Time (sec.) | <1 | <1 | <1 |
| MEK Double Rubs | >80 | >120 | 5 |
| Pencil Hardness | H | 2H | H |
| Tensile Strength @ Break (psi) | — | 4,009 | 3,027 |
| % Elongation @ Break | — | 4.5 | 17.7 |

It is observed that sample A is commercially equivalent to sample E.

EXAMPLES G-J

The procedure outlined for Example E was repeated with bisphenol diepoxide resins of varying molecular weights. It was found that the above properties for sample E were obtainable only with the low molecular weight resin. The results of this comparison are reported in Table III.

TABLE III

| FORMULATION # | G | H | I | J |
|---|---|---|---|---|
| CHVE | 50 | 50 | 50 | 50 |
| EPON-828 (MW = 370-384) | 50 | — | — | — |
| EPON-834 (MW = 460-560) | — | 50 | — | — |
| EPON-1001 (MW = 900-1100) | — | — | 50 | — |
| EPON-1004 (MW = 1750-2050) | — | — | — | 50 |
| APPEARANCE | clear homogeneous | slightly hazy | two layers | two layers |

When using a formulation containing 50 g. of EPON 1004, 25 g. of CHVE and 25 g. of DVE-3 a completely clear coating liquid was obtained and the blend was totally compatible with the resin.

EXAMPLES K-M

The following formulations were prepared according to the general procedure of Example A.

| | SAMPLE | | |
|---|---|---|---|
| K | L | M | |
| 25 g. EPON-828 | 25 g. EPON-828 | 25 g. EPON-828 | |
| 12.5 g. DVE-3 | 12.5 g. DVE-3 | 31.2 g. ECC** | |
| 2 g. FX-512+ | 2 g. FX-512+ | 2 g. FX-512+ | |
| 1 g. Surf.* | 1 g. Surf.* | 1 g. Surf.* | |

-continued

| | SAMPLE | |
|---|---|---|
| K | L | M |
| 12.1 g. CHVE | 15.6 g ECC** | |

*fluorinated alkyl alkoxylate surfactant
**[(3,4-epoxycyclohexyl)methyl] 3',4'-epoxycyclohexane carboxylate
+triphenyl sulfonium hexafluorophosphate The samples were coated on aluminum panels, cured and baked as described in Examples E and F. The properties of these coatings are as reported in Table IV.

TABLE IV

| SAMPLE | K | L | M |
|---|---|---|---|
| Max. cure speed (fpm)$^a$ | 700 | 100 | 100 |
| Tack free time (sec.) | <1 | 125 | 120 |
| Brookfield Viscosity (cps) | 29.5 | 157.0 | 1200.0 |
| Film appearance | glossy | glossy | glossy |

EXAMPLE P

The pencil hardness of sample K, L and M coatings after baking 0.2 mil coatings on aluminum panels were identical and had a rating of H.

EXAMPLE Q

The coatings of Samples K, L and M were subjected to stain resistance tests and compared with an identically coated sample using a formulation similar to K except that CHVE is omitted and 25 g. of DVE-3 is employed (sample N). The stain resistance tests were carried out according to ASTM D-1308 using 2% $KMnO_4$ and 1% $H_2SO_4$ as staining agents. The results of these tests using a rating of 1 (no stain) to 5 (severe stain) are reported in Table V.

TABLE V

| Sample | $KMnO_4/H_2SO_4$ |
|---|---|
| K | 2/1 |
| L | 4/1 |
| M | 4/0 |
| N | 4/2 |

EXAMPLE R

Similarly prepared coatings (1.7 mil each) of baked samples K, L and M were subjected to Mandrel bend tests by wrapping around mandrels of varying diameter. The flexibility was determined (after UV curing and after baking for 10 minutes at 177° C.) by the minimal diameter around which the coating can be coiled without cracking.

The results of this test are as reported in Table VI.

TABLE VI

| | MANDREL DIAMETER (IN) | |
|---|---|---|
| Sample | After UV Cure | After Bake |
| K | ⅛ | ⅛ |
| L | wrinkled surface could not be evaluated | |
| M | 1.3 | ⅛ |

EXAMPLE S

Epoxy novolac resins (phenol-formaldehyde resins) differ from bisphenol resins primarily in their multifunctionality. This multifunctionality leads to a higher crosslink density providing better high temperature performance. A commonly used novolac resin (D.E.N. ®-431, MW=378-394, functionality=2.2, supplied by Dow Chemical Company) was used in a formulation containing 50% D.E.N. ®-431 and 50% CHVE which is clear and homogeneous. However, a thick (4.5 mil) film cast on polyethylene turned hazy, almost opaque after UV exposure. This indicates incompatibility. However, when a blend of 25 g. CHVE and 25 g. DVE-3 were employed with 50 g. of novolac, the liquid product coated on the polyethylene substrate remained clear after UV exposure and after baking for 10 minutes at 177° C.

It will become apparent that many substitutions and alterations can be made in the above Examples to provide the benefits discussed herein. For example, any of the previously described initiators can be substituted for the sulfonium initiators used in the Examples. Also, any of the aforementioned resins can be substituted to show improvement in viscosity lowering, solvent and staining resistance. Similarly, the hydrophilic and hydrophobic components of the blend can be interchanged with other species or mixtures of each component can be employed if desired.

Having thus described the invention, what is claimed is:

1. The composition containing the blend of (a) between about 65 wt. % and about 35 wt. % of a hydrophobic divinyl ether containing from 6 to 30 carbon atoms and having a Tg of from about 20° to about 150° C. and (b) between about 35 wt. % and about 65 wt. % of a hydrophilic polyethylene glycol divinyl ether which blend is mixed with between about 10 wt. % and about 70 wt. %, based on total composition, of an irradiation curable epoxy resin having a molecular weight of from about 300 to about 5,000.

2. The composition of claim 1 wherein the polyethylene glycol divinyl ether is triethylene glycol divinyl ether.

3. The composition of claim 1 wherein the hydrophobic divinyl ether is selected from the group consisting of hexanediol divinyl ether, cyclohexanedimethanol divinyl ether, and polypropylene glycol divinyl ether.

4. The composition of claim 1 wherein the hydrophobic component represents between about 40 and about 55 wt. % and the hydrophilic component represents between about 55 and about 40 wt. % of the blend.

5. The composition of claim 1 wherein the epoxy resin is novolac.

6. The composition of claim 1 wherein the cationic epoxy resin is bisphenol diepoxide.

7. The composition of claim 1 which also contains a wetting agent and an onium salt initiator.

8. The composition of claim 7 wherein the onium salt initiator is a sulfonium salt initiator.

9. The composition of claim 8 wherein the sulfonium salt initiator is triphenyl sulfonium hexafluorophosphate.

10. A substrate having on its surface from about 0.1 to about 50 mils thick coating of the blend of claim 1.

11. The substrate of claim 10 wherein the substrate is coated with from about 0.2 to about 10 mils thickness of said coating.

* * * * *